No. 619,526. Patented Feb. 14, 1899.
H. A. WOOD.
AIR VALVE.
(Application filed Jan. 20, 1898.)
(No Model.)
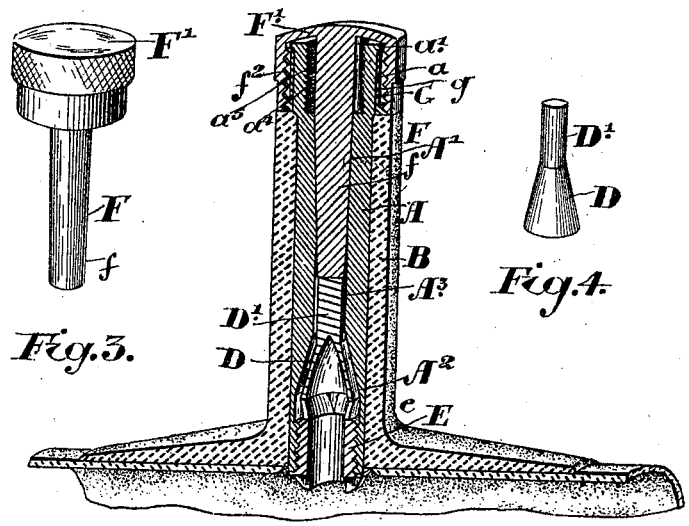
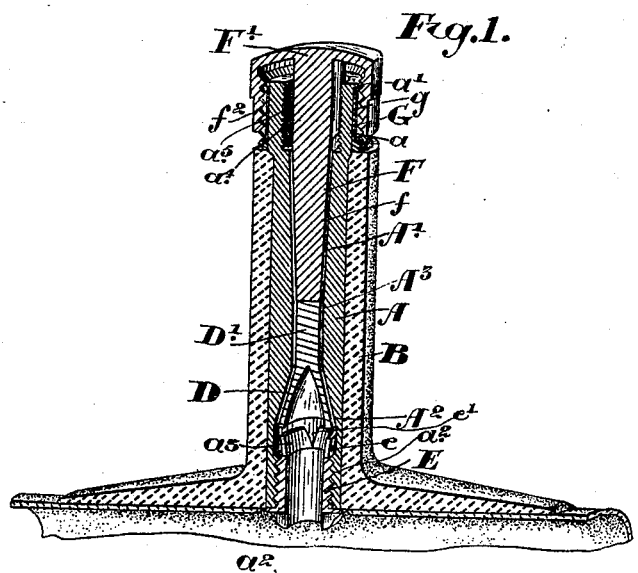
Witnesses.
Inventor:
H. A. Wood.
by Fetherstonhaugh & Co
Att'ys.

UNITED STATES PATENT OFFICE.

HENRY ALFRED WOOD, OF KINGSTON, CANADA.

AIR-VALVE.

SPECIFICATION forming part of Letters Patent No. 619,526, dated February 14, 1899.

Application filed January 20, 1898. Serial No. 667,234. (No model.)

*To all whom it may concern:*

Be it known that I, HENRY ALFRED WOOD, of the city of Kingston, in the county of Frontenac, in the Province of Ontario, Canada, have invented certain new and useful Improvements in Air-Valves, of which the following is a specification.

My invention relates to improvements in air-valves more particularly adaptable for bicycle-tires; and the object of the invention is to design a simple, cheap, and positive-acting form of valve in which there will be no possibility of its getting out of order or allowing of the escape of the air; and it consists, essentially, of forming the hollow shank of the valve with outwardly-flaring seats converging intermediate of the length of the shank and providing for the lower seat a hollow tapered plug with parallel upper stem and for the upper seat a conical plug attached to or forming part of the cap designed to be secured to the upper end of the shank and adapted to unseat the lower valve when required to permit of the deflation of the tire, as hereinafter more particularly explained.

Figure 1 is an enlarged sectional perspective view of my improved form of valve suitable for pneumatic tires, showing the parts of the valve as they would appear when completely closed. Fig. 2 is a similar view showing the valve open, so as to allow of the deflation of the tire. Fig. 3 is a detail of the upper conical valve-plug and cap combined. Fig. 4 is a detail of the lower valve-plug. Fig. 5 is a detail of the threaded loose sleeve.

In the drawings like letters of reference indicate corresponding parts in each figure.

A is the shank of the valve, which is inserted and held in the usual mushroom B, attached to and held in the ordinary manner to the air-tube of the tire. It will be noticed that the shank A is cylindrical in form for the major part, except at the upper end, where it is provided with an annular enlargement $a$ and an end flange $a'$. The shank A has a hole extending through it, the upper portion A' of which is tapered, the greatest diameter being at the top. The lower portion $A^2$ is also tapered, the greatest diameter being, however, at the bottom. The two tapered portions are preferably connected together by an inner cylindrical portion $A^3$.

D is the lower plug, which is made substantially in conical form at the lower portion thereof and hollow, so as to be very light, the size shown in the drawings being much in excess of the actual size used in connection with the bicycle-tire. The upper portion D' is cylindrical in shape. The conical exterior of the plug D is ground, so as to fit very tightly the tapered portion $A^2$ and effectually prevent the escape of the air when it is on its seat.

E is a hollow sleeve which is screwed into the internal thread $a^2$ at the bottom of the shank.

$a^3$ is an annular enlargement located beneath the tapered portion $A^2$ of the opening of the shank. The upper end of the sleeve E flares slightly outwardly at $e$ and is provided with notches $e'$, the upper end of the flange $e$ forming a seat for the bottom edge of the plug D when the valves are closed.

F is the upper tapered valve-plug, which is provided with a stem $f$ and an enlarged head F', forming not only the head of the valve, but also a cap, which is provided with an internal thread $f^2$.

G is an externally-threaded sleeve which is fitted over the enlargement $a$ at the top of the shank A and is held in place by the flange $a'$.

$g$ are grooves extending through the threads on a line with the axis of the sleeve from near the bottom of the threads to the extreme top or outer end.

$a^4$ is an internal thread forming the wall of the chamber $a^5$, located at the top of the upper tapered portion A' of the central opening.

The operation of my valve is as follows: To close the valve from the position shown in Fig. 2, the cap F' is screwed down so as to bring the cap and the threaded portion thereof down over the sleeve G, so as to completely close the groove $g$, and thereby prevent the escape of the air through this course. Simultaneously the plug F is also brought down on its seat A', thereby providing a double means to completely prevent the egress of the air. The lower valve is also forced down on its seat. By unscrewing the cap the groove $g$ of the sleeve G when the cap is partially unscrewed would present a means for communicating with the interior of cap and interior chamber $a^5$ in the shank. As, however, the tapered plug F is also removed from its seat in this position, the air has free passage-way around the plug F. In this position of the upper valve the lower plug will be unseated slightly and allow the air in the tire to escape above the sleeve E and around the plug D, plug F, through the chamber $a^5$, interior of the cap, and out by the groove $g$, thus deflating the tire.

It will be noticed that immediately the valve is unscrewed sufficiently far to uncover the grooves $g$ no matter whether the valve is from its seat or not the air will escape through the notches $e'$. This insures a means whereby the escape of air may be regulated to a nicety. The sleeve G also provides a means whereby the upper valve-plug F is insured of coming down perfectly on its seat, as the sleeve G is quite loose, and thus provides for sufficient lateral motion in screwing down so as to effect this object.

When it is desired to insert the air-pump, it is simply necessary to unscrew the cap F', when the passage-way will be left perfectly free for the escape of the air except that the plug will have closed it up by the force of the air at the back of it causing it to assume its seat. Immediately, however, the air is pumped in it throws it off its seat down against the top of the flange $e$, and the air will pass in through the notches $e'$ into the tire, and upon reverse motion of the pump the valve is thrown again on its seat, so as to prevent the escape of the air pumped in, and so on. When the pumping has been finished, the cap may be replaced in the usual manner, when the parts are securely locked in position and all danger of escape of air is prevented.

In my form of valve it will be noticed that I use no rubber washers or rubber in any form, which now so frequently gets out of order and is so detrimental to the action of the valve now commonly in use.

What I claim as my invention is—

1. In combination with a shank having upper and lower valve-seats within the same, a lower valve kept to its seat by the pressure of air, an upper valve carried by the head or cap and adapted to be seated by positive action, said valves being independent of each other and the upper valve being adapted to unseat the lower valve when seated, substantially as described.

2. In an air-valve, a shank having upper and lower valve-seats, a lower valve actuated solely by the air-pressure to keep it upon its seat, an upper valve independent of the lower valve having a stem adapted to contact with the stem of the lower valve to unseat the same when the upper valve is seated and an air-passage from the upper end of the shank to the exterior whereby in a partial movement of the upper valve the lower valve will be unseated and a permanent air-passage formed around the upper valve to the external air so as to permit of the deflation of the tire, substantially as described.

3. In an air-valve, a shank having upper and lower seats, a lower valve having upwardly-extending stem, an upper valve independent of the lower valve secured to the cap and adapted to contact with the stem of the lower valve to unseat the same when the upper valve is seated, a chamber in the upper end of the shank and a passage extending along the outer face of the shank at the end so as to permit of the escape of air from the tire in the partial release of the cap, substantially as described.

4. In an air-valve, in combination the shank having a central opening therethrough, the said opening tapering outwardly from the intermediate portion thereof toward each end to provide upper and lower valve-seats, a valve adapted to rest on the lower seat, an enlarged cylindrical chamber in the upper end of the shank formed above the upper seat, a cap provided with a conical portion fitted on said upper seat, a loose sleeve fitting upon the upper shank and provided with an external thread to receive the internal thread on the inner end of the cap, a groove extending through the major portion of the sleeve into and communicating with the upper portion of the cap, the said sleeve being held in position on the shank as and for the purpose specified.

HENRY ALFRED WOOD.

Witnesses:
B. BOYD,
A. H. McADAM.